March 2, 1971   J. VOGEL ET AL   3,566,694

PRESSURE TRANSDUCER

Filed Nov. 8, 1968   2 Sheets-Sheet 1

INVENTORS
JOSEF VOGEL
HANS C. SONDEREGGER

BY
*Craig & Antonelli*

ATTORNEYS

March 2, 1971  J. VOGEL ET AL  3,566,694
PRESSURE TRANSDUCER
Filed Nov. 8, 1968  2 Sheets-Sheet 2
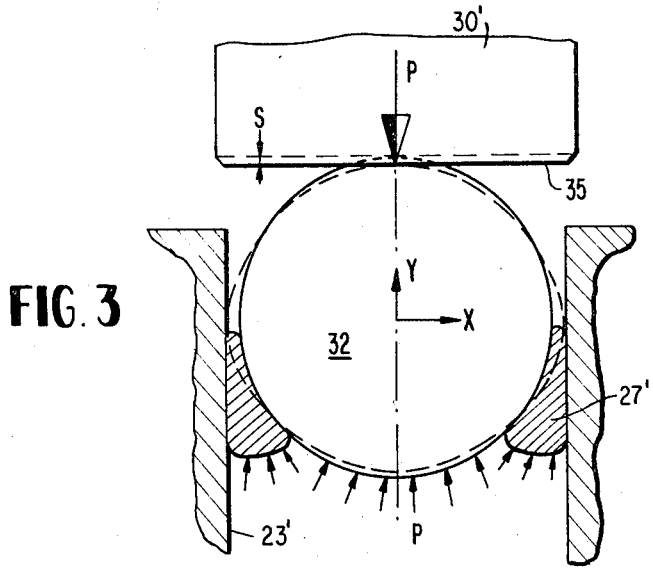
FIG. 3
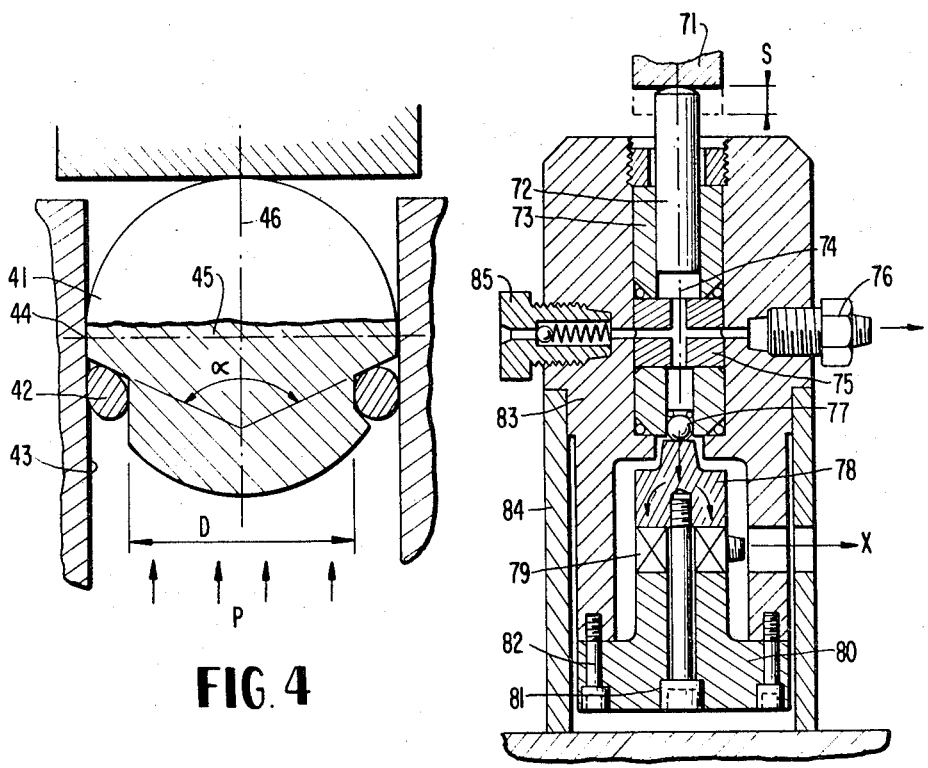
FIG. 4
FIG. 5
INVENTORS
JOSEF VOGEL
HANS C. SONDEREGGER
BY
Craig & Antonelli
ATTORNEYS United States Patent Office 3,566,694
Patented Mar. 2, 1971

3,566,694
PRESSURE TRANSDUCER
Josef Vogel, Winterthur, and Hans C. Sonderegger, Neftenbach, Switzerland, assignors to Kistler Instruments AG, Winterthur, Switzerland
Filed Nov. 8, 1968, Ser. No. 774,359
Claims priority, application Switzerland, Nov. 8, 1967, 15,640/67
Int. Cl. G01l 9/00, 27/00
U.S. Cl. 73—398         4 Claims

ABSTRACT OF THE DISCLOSURE

A pressure transducer for converting a pressure into a mechanical force consists of a bore in which an element with a ball-like surface is fitted with a very small clearance, with means to center this converter element with a sealing device and a force measuring platform with a hard and polished surface perpendicular to the axis of the bore. The pressure sending element is arranged in such a way that the ball-like element rests free and adjustable on the flat surface having practically no deflection when measuring a full range of pressures, which can exceed 100,000 p.s.i.

---

The present invention relates to pressure transducers.

In the art of measurement, there are many applications for pressure transducers which convert the pressure exerted by a pressure medium into a mechanical force. Such pressure transducers are used particularly in pressure comparators in which a gas or liquid pressure is compared with a mechanical force generally produced by weights. Similar pressure transducers are, however, also used in measuring appliances in which the force exerted by the pressure medium is transmitted to an electric measuring cell in which it is converted into an electrical function. Various means are available for this conversion. Pressure measurement or strain gauge strips or piezo-electric, magnetic or capacitive systems can be used.

In all applications, however, one is concerned with the conversion of the pressure of the pressure medium, whether it is a gas, a liquid or a semi-solid material, into a corresponding mechanical force. In known appliances, this conversion is effected by a metal piston which is guided in a sleeve. If the pressure medium has a high pressure, for example, over 1,000 atmospheres, special sealing problems arise which require extremely complicated measures to secure a satisfactory sealing between the piston and its guide. In order that at high measuring pressures measurement forces are obtained which can be handled in practice, one is led to use either small piston diameters, or, if this is not possible, the known system of the differential piston is adopted. In this way with relatively large piston diameters, very small operative pressure surfaces are obtained whereby distortion of the piston can be avoided.

For satisfactory conversion of the pressure of the medium into a mechanical force, mechanical friction between the piston and its guide must be avoided under all circumstances. As soon as friction occurs, backlash or hysteresis errors occur which make the measuring appliance unsatisfactory. In known arrangements of such pressure-checking appliances, the piston is subjected to oscillation or rotation in order that sticking thereof in its guides is avoided. Experience, however, shows that despite rotation of these pistons, backlash errors can occur especially at high pressures. Such errors are produced by the fact that the necessary lubricant between the piston and its guide can disintegrate in the very narrow ring gap and thereby local sticking effects are produced. The whole procedure of this sticking action due to the lubricant is extremely complicated and has not so far been sufficiently explained theoretically.

According to the features of the invention, an entirely new way is provided of overcoming this problem of sealing and lubricating pistons in their guides. An important condition for the operation of the pressure converter according to the invention lies in the fact that the movement thereof for the purpose of pressure measurement is limited to a minimum, that is to say, to a few μm. This can be obtained by the fact that the pressure-measuring element connected to the pressure converter is very rigidly constructed so that for the full stroke only a few μm. deformation are necessary. Such pressure-measuring elements are commonly available today on the market. They can be on the basis of strain gauging, strips or piezo-electric, magnetic or capacitive elements. Pressure-measuring elements of the piezo-electric type which can be built with a rigidity which corresponds to a solid metal cylinder are preferred.

The features of the invention will be further explained by way of example with reference to the drawings, in which:

FIG. 3 shows a ball-shaped sealing piston of the pressure transducer according to the invention with a deformed sealing ring wedge when the pressure transducer is subjected to high pressure;

FIG. 4 shows a modification of a ball-shaped sealing piston of the pressure transducer according to the invention with a differently arranged sealing ring; and FIG. 5 shows an application of the pressure transducer according to the invention assembled as a testing device for load cells, pressure gauges or like control devices.

Figure 1:
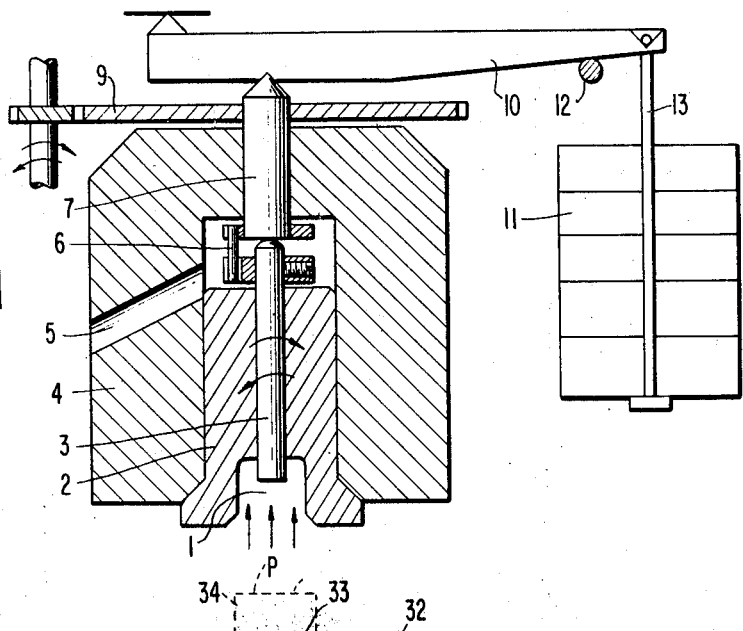
FIG. 1 shows a pressure transducer as is normally used for testing equipment for pressure gauges, load cells, and similar pressure-responding elements.

The main parts of a commercial lever comparator is shown in FIG. 1 where the pressure conversion into a force is effected. The measurement pressure $p$ is applied to the chamber 1 and acts on the piston 3. The latter is lapped into a guide bush 2 with a close fit. The guide bush 2 is pressed into the casing 4. The measuring piston 3 presses on the guide plunger 7 which bears on a lever 10. The drive 9 imparts to the piston 7, and via the driver member 6 also to the measuring piston 3, an oscillating or rotary movement without exerting an axial force action on the measuring piston 3. Various test weights 11 are suspended from the hanging frame 13. If the measuring pressure $p$ increases slowly until it just lifts the lever 10 from the stop 12, the balance between the measuring pressure and the measuring force is reached. This balance condition should occur both for rising and for falling measuring pressures at the same point in each case. At higher pressures, for example, over 1,000 atmospheres, this is, however, only obtainable with difficulty so that backlash errors occur. The reason for this disturbance lies in the decomposition effects of the lubricant in the gap between the piston and the guide as well as in the deformation of the piston in its guide. If gaseous media are measured, the piston 3 requires additional lubrication which in high pressure ranges can again lead to similar disturbances.

Figure 2:
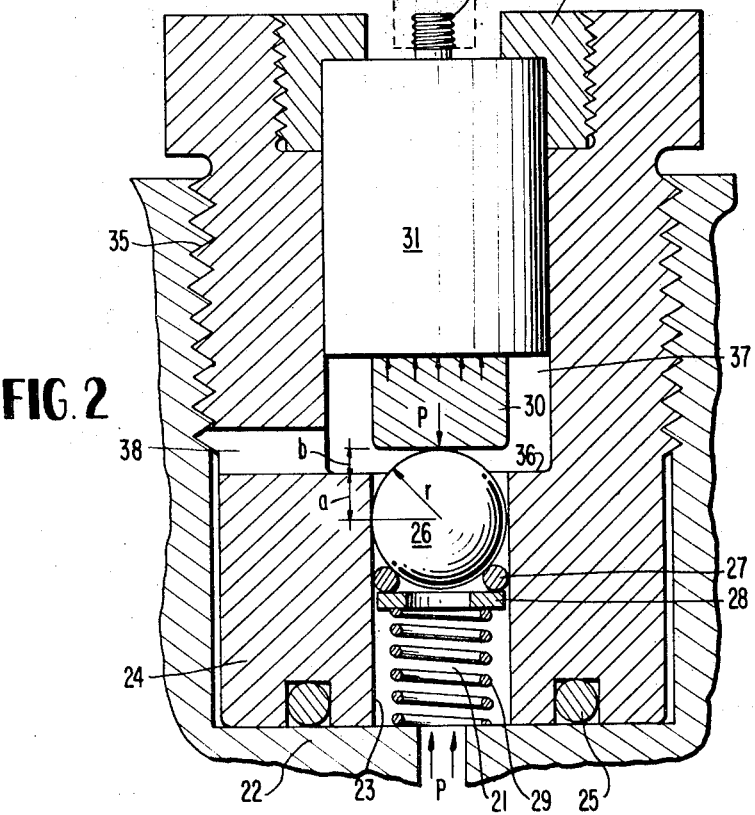
FIG. 2 shows a pressure transducer according to the invention which is connected with a pressure-measurement cell as a unit.

The object of the invention is shown in FIG. 2 as an example of a self-contained pressure measurement transducer. The measuring pressure $p$ reaches the measuring chamber 21 which is formed by the highly polished bore 23 in the body 24. The body 24 is forced by the mounting thread 35 into the component 22 and the sealing ring 25 serves as a seal. The ball 26 with the sealing ring 27 now acts in the bore 23 as a pressure transducer whereby the pressure force P produced is transmitted by means of a pressure-transmitting member 30 to the electric force-measuring element 31. The force-measuring element 31 is provided with a connection 33 for a coupling 34 on connector cable leading to the evaluating appliance. The force-measuring element 31 is fixedly connected to the casing 24 by means of the ring screw 32. The ball 26 is fitted in the bore 23 with clearance such that the distance $a$ of the ball meridian from the end of the bore 36 amounts to about 0.8 r. and $b$ is about 0.2 r. A bore 38 serves to vent the ring chamber 37 and brings it into communication with the surrounding pressure. The disc 28 and the compression spring 29 are not necessary for the operation of the sealing piston but facilitate operation after long interruptions in testing in that the sealing ring 27 is pressed with a light constant pressure against the sealing ball 26.

The operation of the pressure converter piston according to the invention is further explained in FIG. 3. 23' is a highly polished calibrated bore, 32 is again a ball-shaped piston, and 30' is the pressure transmitting member which is operatively connected to the measuring cell. The deformed sealing ring 27' beds in wedge form between the sealing ball and the bore under the action of the pressure $p$ and the bearing pressure P deforms the ball from the original full line shape into the oval form shown dotted. Thereby the play between the ball and the bore is reduced. This play must be selected in design so that contact of the bore with the ball meridian does not occur even under the maximum pressure since otherwise friction and possibly jamming would result. By the wedge action of the sealing ring 27', the ball is centered accurately in the bore so that it does not touch the bore wall at any point.

There is also the condition that the ball can move in the x-direction freely on the support 30', which is obtained by the fact that the support 30' is worked optically flat on the contact plane 35 and consists of a very hard material, for example, hard metal or a ceramic oxide material. Thereby the result is secured that even for very high pressures there is a very small indentation of the outer surface 35 or in the outer surface of the ball. It is of very great importance that the deformation $s$ for the response of the associated force-measuring cell from zero up to the maximum value is held to the order of magnitude of a few $\mu$m.

Experience has shown that this small deformation is approximately compensated by the oval deformation of the ball so that displacement of the sealing ring 27' relative to the wall of the bore does not occur in practice. This explains how practically backlash-free conversion of pressure into force can be effected with the transducer element according to the invention. By the fact that the ball-shaped sealing member 26, 32 is in no way in wall contact, all friction is eliminated. The sealing ring 27, 27' consists of a highly elastic high strength material, for example, "Vitron," or a similar high-grade synthetic rubber, and acts under high pressure like a liquid so that lubrication of the transducer element according to the invention is not necessary since, as stated, no sliding metal surfaces are present. This leads also to special advantages in the measurement of dry gases under high pressures, a field which is becoming of increasing importance in recent developments. The usual ball-bearing steel or tungsten can be used for the ball-shaped member 26, 32 and for special cases also bodies of ceramic materials or crystals can be produced. The bore 23, 23' consists in the usual way of a special hardened material with a ground and honed outer surface.

FIG. 4 shows a modification of the ball-shaped sealing piston in which the ball body 41 is ground on the diameter D. The bearing angle $\alpha$ of the sealing ring 42 is determined from empirical investigations and can range between 180° and 90°. According to the value of the angle $\alpha$, a more or less strong centering of the ball body 41 is obtained by the sealing ring 42. At the same time, with this arrangement, the deformation of the sealing ring 42 can also be held within desired limits at very high pressures without the danger that the sealing ring is pressed through the ring gap between the ball-shaped body and the bore. In place of grinding, a groove can also be cut as is indicated in dotted lines. In this way, an automatic securing of the sealing ring 42 is possible.

Turning of the ball body does not occur during assembly since the sealing ring 42 is so chosen that already in the condition of rest it exerts pressure against the bore wall 43 while the ball body 41 has a certain clearance at its meridian point 44 in respect to the bore 43. Thereby, automatic positioning of the ball body 41 is produced on assembly whereby the ball meridian 45 is placed precisely at right angles to the bore axis 46. By the centering action of the sealing ring 42, subsequent rotation of the ball body 41 under the influence of the pressure $p$ is not possible.

FIG. 5 shows an application of the pressure transducer according to the invention in the form of an electronic testing unit. With such a unit pressure gauges, test cells, and control appliances to be calibrated for pressure can be checked. The appliance is placed under a normal mechanical press for the checking operation whereby the press ram 71 and the displacement piston 72 are brought under pressure and move through a distance $s$. The displacement piston 72 fitting within the sleeve 79 displaces the pressure medium in the displacement chamber 74 whence it is transmitted through a distributor member 75 both to a pressure responder or test cell 76 to be checked and also to the pressure converter element 77. The pressure converter element 77 transmits the converted force P to the transmission member 78. The latter is operatively connected under pre-stress to a terminal counter member 80 through the pressure-measuring element 79 of ring-shaped construction. Pre-stressing is obtained by the screw 81.

By the pre-stressing, all the lapped outer surfaces of the three parts 78, 79 and 80 lie in intimate contact so that no gap yield occurs which would cause additional deformation. The terminal member 80 is operatively connected by screws 82 to the body 83. The body 83 in turn rests on the support ring 84. For the case where pressure medium flows out of the pressure chamber 74 when another measuring element is inserted in place of the load cell 76, further pressure medium can be forced in by means of the refill nipple 85 whereby the displacement piston 72 is forced back to its upper starting position whereupon the pressure operation can be carried out again.

As usual, the electrical output of the force-measuring ring 79 is supplied through the necessary amplifier to the x-axis of a two-coordinate indicator or recording device, and the output of the load cell 76 is correspondingly fed to the y-coordinate of the said indicator or recording device. The appliance thus provides checking equipment which is very simple to operate and is precise which permits rapid calibration of load cells and similar control appliances. It is, however, also possible to carry out point-by-point investigations with the appliance as is the case with the previously used weight-loaded control equipment.

The invention thus opens up quite new possibilities in the field of high-pressure measurement. By the use of the ball-shaped pressure transducer element which can be so positioned on a hard flatly worked force-transmitting element that by the wedge-shaped deformation of the sealing ring under pressure, an automatic centering of the ball-shaped transducer element is obtained. Thereby, all mechanical contact with the wall of the bore is avoided whereby additional lubrication is unnecessary. At the same time, no friction is produced and thus no backlash errors.

The invention thus brings a substantial technical simplification and improvement to the field of measurement of high pressures of gases and liquids.

We claim:
1. A pressure transducer for converting a pressure derived from a pressure medium into a mechanical force, comprising a ball-shaped transducer element which is positioned in a measuring bore and is centered by means of an elastic sealing ring in said measuring bore by the pressure of the medium and is supported for free lateral movement by a flat hard face of a pressure-transmitting element.

2. A pressure transducer according to claim 1, characterized in that said ball-shaped pressure transducer element fits in the measuring bore in such a manner that even for deformation thereof under high pressure effects, no metallic contact is produced with the measuring bore and further no penetration of the sealing ring occurs because of excessive play.

3. A pressure transducer according to claim 1, characterized in that said ball-shaped transducer element is connected in series with a force-transmitting plate and an electric force-measuring element so that the axial movement of the pressure transducer element is only a few $\mu$m. for the full measuring range.

4. A pressure transducer according to claim 1, characterized in that said ball-shaped transducer element includes a means comprising a recessed groove and a sealing face machined in said element to a predetermined angle for providing said automatic centering of said element upon action of the fluid pressure.

References Cited

UNITED STATES PATENTS

| 2,748,602 | 6/1956 | Weber | 73—419X |
| 3,047,005 | 7/1962 | Karr | 73—4(D) |
| 3,264,872 | 8/1966 | Martin, Jr. | 73—419 |
| 3,333,464 | 8/1967 | Statham et al. | 73—398X |
| 3,366,017 | 1/1968 | Firth et al. | 92—172 |

LOUIS R. PRINCE, Primary Examiner

H. C. POST III, Assistant Examiner

U.S. Cl. X.R.

73—4, 419